United States Patent [19]
Ahlers et al.

[11] 3,905,523
[45] Sept. 16, 1975

[54] FLUID FERTILIZER CONTROL APPARATUS

[75] Inventors: William H. Ahlers, Harlan, Iowa; Robert E. Derr; La Monte H. Sahling, both of Wood River, Nebr.

[73] Assignee: Harlan Mfg. Co., Inc., Harlan, Iowa

[22] Filed: Aug. 29, 1973

[21] Appl. No.: 392,676

[52] U.S. Cl. ............... 222/504; 137/344; 222/176; 239/172
[51] Int. Cl. ...................... F16k 5/06; F16k 31/163
[58] Field of Search ............... 137/344, 382.5, 551; 251/62, 280, 63.4, 279; 239/176, 74, 169, 163, 569, 164, 412, 146, 159, 172, 170; 222/71, 504, 176; 23/259.1, 259.2, 259.3

[56] References Cited
UNITED STATES PATENTS

| | | | |
|---|---|---|---|
| 1,747,793 | 2/1930 | Pounds et al. | 239/172 |
| 1,761,723 | 6/1930 | Greer | 239/172 |
| 2,060,409 | 11/1936 | Ball | 137/344 X |
| 2,261,871 | 11/1941 | Carswell | 239/169 |
| 2,310,073 | 2/1943 | Greig | 137/344 |
| 2,436,419 | 2/1948 | Cartwright | 239/159 X |
| 2,593,696 | 4/1952 | Pool | 239/175 X |
| 2,596,473 | 5/1952 | Essick | 239/172 |
| 3,034,727 | 5/1962 | Paulson | 239/169 |
| 3,143,295 | 8/1964 | Booker | 239/148 X |
| 3,301,487 | 1/1967 | Young | 239/172 X |
| 3,474,829 | 10/1969 | Scheineman | 251/280 X |

Primary Examiner—Martin P. Schwadron
Assistant Examiner—Robert J. Miller
Attorney, Agent, or Firm—Henderson & Strom

[57] ABSTRACT

A control apparatus having a valve unit interposed between the fluid fertilizer supply and the meter structure of a fertilizing apparatus. The valve unit is remote from the meter and has an actuator rotatably inserted therein. A hydraulic cylinder is affixed to the actuator and effects rotation of the actuator whereby the valve unit is opened and closed.

1 Claim, 5 Drawing Figures

FLUID FERTILIZER CONTROL APPARATUS

BACKGROUND OF THE INVENTION

This invention relates to fluid flow control device, particularly of the type used to control the flow of fluid fertilizer between the supply tank and the meter mounted upon the fertilizer incorporating implement.

A fertilizer incorporating system normally includes a supply tank, a tractor drawn implement such as a cultivator, tool bar or other implement suitable for application, pipe and hose apparatus affixed to the implement and leading from a meter, also affixed to the implement, to the group, and a supply hose running between the tank and meter. Flow control has been achieved by rope controls, electric controls, and one-way hydraulic controls affixed to the meter valve. Meters as a result have been very susceptible to breakage due to the constant operation of the control means and the opening and closing of the valve at the meter.

Electric controls have further disadvantages in that they require an extensive amount of maintenance for proper performance and in any event perform poorly when the weather is cool or cold. Electric controls require hookups to be placed upon a tractor as well as the implement to be controlled and therefore cannot be easily switched from tractor to tractor. Furthermore, the control is normally actuated by a solenoid device and shut off by a return spring apparatus. The spring is susceptible to breakage, and the meter valve seat may become clogged, both situations leading to ineffective control over the fertilizer flow.

A one-way hydraulic control suffers from the same possibility of breakage of the return spring as the electric control does. Furthermore, extra hydraulic apparatus involving check valves is required if the tractor cannot maintain an adequate pressure in the lines.

Finally, the rope control, the oldest type in the art, is the most dangerous, especially when anhydrous ammonia is the fertilizer being used, in that so many circumstances can cause the system to fail while the meter is open and prevent the operator from shutting off the flow of fertilizer. Examples would be the rope breaking, the rope looping over and becoming caught on some part of the meter or implement, or the spring mechanism on the meter breaking or becoming jammed by foreign material, etc.

Other inconveniences caused by the open cab include the blowing of dust into the cab and the rendering ineffectual of any air-conditioning equipment located therein.

SUMMARY OF THE INVENTION

According to this invention a remote control apparatus is provided which is suitable for regulating the flow of fluid fertilizer between an supply tank and the meter of the incorporating apparatus mounted upon an implement.

A valve body is held between the supply tank and the meter at a distance from the meter by a support structure. The fertilizer hose is received by the valve body between the tank and the meter. The support is detachably affixed to the implement and includes a base and vertically disposed side components. The valve is mounted to a side component.

An actuator is rotatably received by the side components and also by the valve body. The actuator is adapted by means of an arm attached intermediate its end to pivotally receive a double-acting piston and cylinder. The hydraulic cylinder is pivotally affixed at its opposite end to the base and is connected to the hydraulic system of the tractor.

It is the object of this invention to provide a novel apparatus for simultaneously effectively controlling the flow of fluid fertilizer while providing for minimum wear and likelihood of breakage to the flow metering device.

It is a further object of this invention to provide a sturdy control apparatus capable of functioning properly with a minimum amount of maintenance and in a wide range of weather conditions.

Another object of this invention is to provide a control apparatus which ensures a positive shut-off of the fluid fertilizer flow to the meter.

Still another object of the invention is to provide a control apparatus which is readily interchangeable between tractors.

Another object is to provide a control apparatus which is easy to operate and safe to operate in times of emergency such as fertilizer leakage from the system.

It is also an object of this invention to provide a superior support structure for mounting a hydraulic cylinder in a fluid fertilizer control apparatus.

These objects and other features and advantages of this invention will become readily apparent by reference to the following description when taken in conjunction with the accompanying drawings.

BRIEF DESCRIPTION OF THE DRAWINGS

The appended drawings illustrate the invention, wherein.

DESCRIPTION OF THE PREFERRED EMBODIMENT

Figure 1:
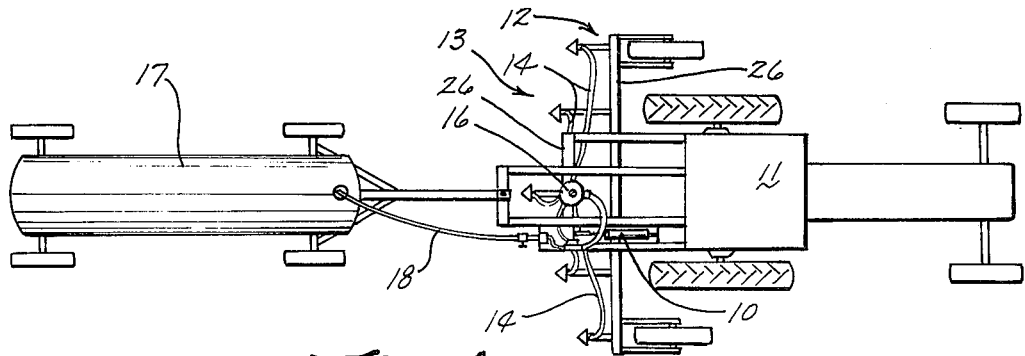
FIG. 1 is a top plan view of the invention in attachment with an implement and incorporating system during the operation of fertilizing.

Referring now to the drawings, the invention is indicated generally at 10 in FIG. 1 during the fertilizing process. A tractor 11 draws an implement 12 with the invention 10 and incorporating apparatus 13 comprising hose 14 and a meter and meter valve structure 16 mounted thereon. A portable fertilizer supply or nurse tank 17 is hitched to the implement 12, and a source line 18 travels between the tank 17 and the incorporating system 13. The flow from the tank 17, through line 18 to the implement 12 is caused by high pressure in the tank 17. The invention 10 is mounted upon the implement 12 on one side of the longitudinal axis of the tractor 11, implement 12, tank 17 combination.

Figure 4:
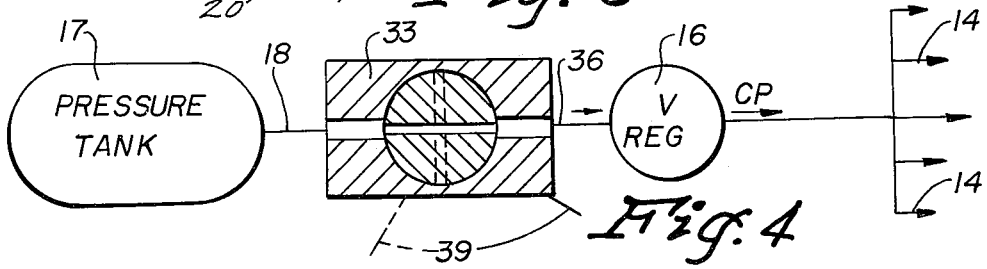
FIG. 4 is a schematic diagram of the present invention.
Figure 5:
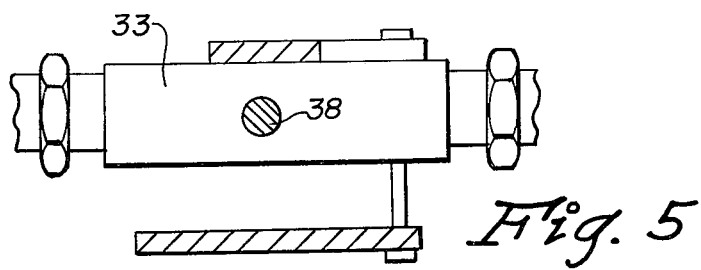
FIG. 5 is a partial cross-sectional view taken along line 5—5 of FIG. 2 showing a rotary actuator received in a valve body.

The metering structure 16 (FIGS. 1 and 4) is of any conventional design well knwon in the art, for example like the metering structure shown in U.S. Pat. Nos. 2,488,647, 2,623,331, or 2,807,144.

The preferred embodiment 10 generally includes (FIGS. 2 and 3) a valve means 21 and a hydraulic means 22.

More particularly, the valve means 21 includes a support structure 20 comprising an elongated base member 24 which is horizontally disposed and detachably affixed by means of bolted clamps (not shown) to the beams 26 of the implement 12. Vertically disposed and transversely spaced elongated left and right side members 27, 28 are attached to a forward part of the base 24. An L-shaped bracket 29 with a quick-detachment coupling 30 mounted therein for receiving the source line 18 is affixed centrally at the front of the base 24. A vertical projection 31 is affixed toward the rear of the base 24, the bracket 29 and projection 31 being in alignment along the longitudinal axis of the base 24.

The valve means 31 also includes a valve body 33 which is affixed to the upper portion of the left side member 27 and directed away from the right side member 28. Horizontally disposed unions 32, 34 are affixed to the front and rear of the valve body 33. A first hose portion 35 attaches between the coupling 30 and the front union 32, and a second hose portion 36 is affixed between the rear union 34 and the meter valve 16. An actuator member indicated at 37 includes a rod 38 and an arm 39 perpendicularly affixed to the center of the rod 38. The rod 38 is rotatably received by and passes through the upper portion of the side members 27, 28. The rod 38 is rotatably inserted into the valve member at one end, and at the opposite end an indicator arm 40 is attached.

The hydraulic means 22 includes a double-acting cylinder 41 having hydraulic lines 42 connected with the hydraulic system of the tractor 11. The exposed portion of the piston shaft 43 and the opposite end of the cylinder 41 have clevis ends 44 affixed thereto. Pins 45 and locking clips 46 are used to pivotally affix the piston 44 to the arm 39 and the cylinder 41 to the projection 31.

When in use the invention 10 is operated from controls on the hydraulic console of the tractor 11. The control for the invention 10 is therefore conveniently close to the control for raising and lowering the implement 12. The meter valve 16 is left open during the whole fertilizing operation, the fertilizer flow from the tank 17 through the meter 16 being controlled by the invention 10.

Figure 2:
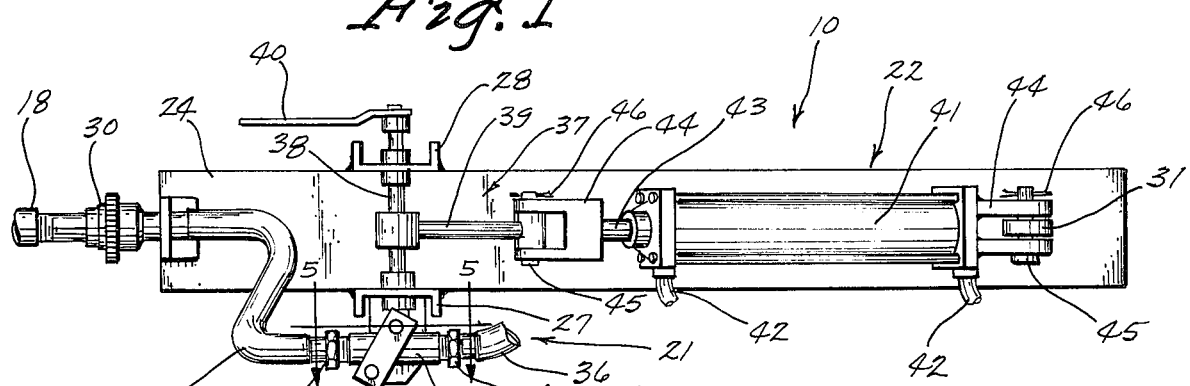
FIG. 2 is an enlarged, fragmentary, top plan view illustrating the preferred embodiment of the invention.
Figure 3:
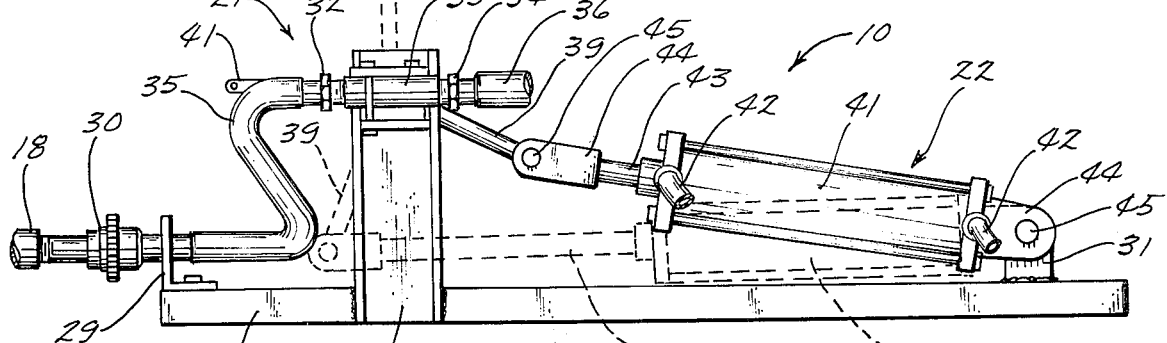
FIG. 3 is an enlarged, fragmentary, side elevational view of the preferred embodiment of the invention.

FIGS. 2 and 3 depict the invention 10 in the closed position with the piston shaft 43 drawn into the cylinder 41. The indicator arm 40 assumes a horizontal position when the actuator 37 has shut off the valve means 21. The hatched lines in FIG. 3 depict the position of the cylinder 41 when the valve means 21 is in the open position. The extension of the piston shaft 43 pushes the arm 39 thereby rotating the rod 38 of the actuator 37 within the side members 27, 28 and the body member 33, the piston shaft 43 and cylinder 41 pivoting about the pins 45. The indicator 40 moves to a vertical position signaling that the fertilizer is now freely flowing through the valve member 33.

The base 24 of the support 20 may be of the various lengths required by the spacing of the beam 26 of the various types of implements 12.

Since the switching on and off of the flow is done at a distance from the meter 16, which remains in the "on" position during the whole incorporation process, the meter 16 wears longer and is less like to break. The use of a double-acting cylinder 41 provides for a more positive closure, of the valve means 21, and the maintenance is much simpler than for electric controls. The detachment features of cylinder 41 and the base 24 provides for rapid and easy interchange of implements 12 and tractors 11 employing the invention 10. Thus it can be seen that the objects of this invention are met by the preferred embodiment.

It is to be noted that although this specification illustrates use of the invention with a supply tank of the nursing type, it is just as effectively useable with any other arrangement, such as where the tank is mounted on the implement or tractor, in which case there could be more than one tank employed.

Although a preferred embodiment and various modifications have been disclosed herein, it is to be remembered that various modifications and alternate constructions can be made thereto without departing from the full scope of the invention, as defined in the appended claims:

We claim:

1. Fertilizing apparatus comprising:
   a supply tank for holding liquid fertilizer and having an outlet;
   rotary valve means including a valve body having two ports, one of said ports being in fluid communication with said supply tank outlet;
   a metering valve having an inlet and an outlet, said metering valve inlet being in fluid communication with the other port of said valve means;
   means in fluid communication with the outlet of said metering valve for applying fertilizer to the soil;
   support means including a base and two spaced upstanding members rigidly affixed to the base and extending substantially normal to the base, said valve body being mounted to the side of one of said upstanding members opposite from the other upstanding member;
   a rotary valve actuator journaled along a first axis through said upstanding members, said actuator being rotatably received into said valve body, whereby rotation of said actuator effects opening or closing of said valve to the transmission of fluid therethrough;
   an arm member rigidly attached to said actuator at one end thereof at a point on said actuator intermediate said upstanding members, said arm member being substantially perpendicular to the actuator;
   a hydraulic cylinder pivotally mounted at one end thereof on a second axis fixed with respect to said base;
   the other end of said hydraulic cylinder being pivotally mounted to the other end of said arm member along a third axis; and
   wherein said first, second and third axes are substantially parallel with respect to each other.

* * * * *